United States Patent
Peters et al.

(10) Patent No.: US 9,383,233 B2
(45) Date of Patent: Jul. 5, 2016

(54) SENSOR DEVICE AND METHOD FOR PRODUCING A SENSOR DEVICE

(71) Applicant: Robert Bosch GmbH, Stuttgart (DE)

(72) Inventors: Christian Peters, Palo Alto, CA (US); Maxime Loidreau, Vinay (FR)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/665,377

(22) Filed: Mar. 23, 2015

(65) Prior Publication Data

US 2015/0268069 A1 Sep. 24, 2015

(30) Foreign Application Priority Data

Mar. 21, 2014 (DE) .................. 10 2014 205 361

(51) Int. Cl.
*H05K 7/02* (2006.01)
*G01D 11/24* (2006.01)
*H04W 84/18* (2009.01)
*H01M 2/00* (2006.01)

(52) U.S. Cl.
CPC .............. *G01D 11/24* (2013.01); *H01M 2/00* (2013.01); *H04W 84/18* (2013.01); *Y10T 29/49117* (2015.01)

(58) Field of Classification Search
CPC ....................................................... H05K 7/02
USPC .......................................................... 73/431
See application file for complete search history.

(56) References Cited

U.S. PATENT DOCUMENTS

| | | | | |
|---|---|---|---|---|
| 6,436,258 B1 * | 8/2002 | Uchikoshi | ............ | G01N 27/404 204/415 |
| 8,982,579 B2 * | 3/2015 | Rapisarda | ............... | A43B 3/001 361/679.41 |
| 2004/0183182 A1 * | 9/2004 | Swindlehurst | ....... | G06K 19/077 257/686 |
| 2005/0054901 A1 * | 3/2005 | Yoshino | ............. | A61B 1/00096 600/176 |
| 2009/0205435 A1 * | 8/2009 | Buck | .................... | B60C 23/0411 73/753 |
| 2012/0086457 A1 * | 4/2012 | Meisner | ............. | G01R 31/3606 324/431 |
| 2013/0017421 A1 * | 1/2013 | Onnerud | ................. | B60R 21/01 429/61 |
| 2013/0279099 A1 * | 10/2013 | Seiler | ..................... | G01D 11/24 361/679.01 |
| 2014/0172241 A1 * | 6/2014 | Shima | ................. | B60C 23/0416 701/49 |
| 2014/0200538 A1 * | 7/2014 | Euliano | ................... | A61F 13/42 604/361 |
| 2014/0268524 A1 * | 9/2014 | Gogoi | ..................... | H01L 27/14 361/379.01 |
| 2014/0309505 A1 * | 10/2014 | Euliano | ................ | A61B 5/4833 600/302 |
| 2014/0342203 A1 * | 11/2014 | Elian | .................... | G01L 19/0069 429/90 |
| 2015/0102821 A1 * | 4/2015 | Henrici | ................. | H01M 10/48 324/437 |

FOREIGN PATENT DOCUMENTS

JP          2006284312 A  * 10/2006

* cited by examiner

*Primary Examiner* — Lisa Caputo
*Assistant Examiner* — Jamel Williams
(74) *Attorney, Agent, or Firm* — Norton Rose Fulbright US LLP

(57) ABSTRACT

A sensor device is provided, which has an energy storage cell and at least one carrier substrate for at least one detector. The sensor device is characterized in that the at least one carrier substrate has at least one contact section for producing an electrically conductive and mechanical contact to the energy storage cell.

14 Claims, 2 Drawing Sheets

SENSOR DEVICE AND METHOD FOR PRODUCING A SENSOR DEVICE

FIELD OF THE INVENTION

The present invention relates to a sensor device and to a method for producing a sensor device, particularly in the field of smaller, energy self-sufficient and, for instance, wireless sensor systems for IoT, the Internet of Things, for example.

BACKGROUND INFORMATION

For the Internet of Things, particularly small, wireless and energy self-sufficient sensor systems may play a decisive part, such as monitoring the space climate, for example, or the like. Besides the electronic components required for this, energy stores of such sensor systems may represent an important component.

SUMMARY

With this as background, the approach provided here is a sensor device and a method for producing a sensor device.

According to specific embodiments of the present invention, especially in the case of a sensor device, at least one carrier substrate, on which electrical and electronic components may be situated, may be used for contacting an energy store, an energy store cell and a battery of the sensor device. In this context, the sensor device and the sensor system provided here are particularly designed so that one may do without a battery holder that is used conventionally. Consequently, a carrier substrate, on which electrical components are able to be applied and connected electrically, may also be used as contact for at least one of the two battery contacts or energy store cell contacts. This attributes to the carrier substrate an additional functional task.

According to specific embodiments of the present invention, because of the omission of a separate battery holder, a number of components is able to be reduced, and thus cost savings may be achieved. A sensor device according to specific embodiments of the present invention may also be shaped more compactly than would otherwise be possible, particularly with respect to area and volume. Thus it is possible, for instance, that a base area of a sensor device is no longer determined by a battery holder, but by the much smaller battery. Based on a sensor device thus diminished, acceptance of same in the marketplace may thus be increased. Thus, the adaptation of an energy store to a sensor node or sensor device is advantageously solved. Compared to commercially available battery holders, which frequently use up much volume and increase system costs, installation space and costs may be saved according to specific embodiments of the present invention.

A sensor device is provided which has an energy storage cell and at least one carrier substrate for at least one detector, wherein the at least one carrier substrate has at least one contact section for producing an electrically conductive and mechanical contact to the energy storage cell. The detector is a sensor, particularly a temperature sensor and/or an air quality sensor and/or an air pressure sensor and/or an air humidity sensor and/or an acceleration sensor and/or a compass sensor and/or a chemical sensor.

The sensor device may be used, for example, in the field of networked systems, such as for the Internet of Things (IoT), for space climate monitoring, or the like. The carrier substrate may be shaped as a printed circuit board, a semiconductor substrate, or the like. The carrier substrate may be shaped of a composite material such as FR4, for example. The at least one contact section may be developed to produce an electrically conductive and mechanical contact between the energy storage cell (which may be developed, for example, as a galvanic cell, a capacitive store and/or as a fuel cell) and the carrier substrate or at least one electric line in the carrier substrate. In the present case, a device or sensor device may be understood as an electrical unit which processes sensor signals and outputs control signals and/or data signals as a function thereof. The device or the sensor device may have at least one interface. which may be developed in the form of hardware and/or software. In a hardware implementation, the interfaces may be part of a so-called system ASIC, for instance, which encompasses a wide variety of functionalities of the device or detector. However, it is also possible that the interfaces are separate, integrated circuits or are at least partially made up of discrete components. In a software development, the interfaces may be software modules which, for example, are present on a microcontroller in addition to other software modules.

According to one specific embodiment, the at least one carrier substrate may have at least one base area which is smaller than, or equal to a base area of the energy storage cell. Such a specific embodiment has the advantage that the size of the sensor device may be reduced, and is limited essentially only by dimensions of the energy store or the galvanic cell.

Furthermore, the energy storage cell may be able to be mounted or be mounted on the at least one contact section of the at least one carrier substrate using soldering means or an electrically conductive adhesive. Consequently, a contact between the energy storage cell and the at least one contact section of the at least one carrier substrate may be able to be produced or be produced using an electrically conductive, continuous material connection. Such a specific embodiment has the advantage that no mechanical holding elements are required, and thus savings may be made on space, costs and parts.

The energy storage cell may also be shaped as a galvanic cell and/or as a button cell, particularly as a secondary element cell in the shape of a button cell. Such a specific embodiment has the advantage that a requirement for a small model of the sensor device is able to be satisfied, since the volume-to-capacity ratio of a button cell is very high.

In this context, the at least one contact section may be situated on a first main surface of the at least one carrier substrate, on a second main surface, lying opposite the first main surface, of the at least one carrier substrate, the at least one detector being able to be situated or being situated. The at least one detector may be connected electrically conductively on the second main surface of the at least one carrier substrate with the carrier substrate or with at least one electric line in the carrier substrate. At the second main surface of the at least one carrier substrate, additionally a control device, such as a microcontroller, a data transmission device, such as a radio chip, an antenna and additionally or alternatively at least one further electronic component or sensor device may be able to be positioned or may be positioned. Such a specific embodiment has the advantage that a compact, wireless and energy self-sufficient sensor device may be provided.

According to one specific embodiment, the sensor device may have a carrier substrate and a connecting device which is able to be connected to the carrier substrate or is connected to the carrier substrate in an electrically conductive manner. In this case, between a contact section of the carrier substrate and a first terminal of the energy storage cell may be producible or be produced, between the connecting device and a second terminal of the energy storage cell a second contact being able to be produced or being produced. The connecting device may be a flexible band having a plurality of electric lines. Such a specific embodiment has the advantage that the sensor device is able to be particularly compact and thus be executed in a space saving manner.

Alternatively, the sensor device may have a first carrier substrate, a second carrier substrate and a connecting device, using which, the carrier substrates are able to be connected or are connected to each other in an electrically conductive manner. In this case, the energy storage cell is able to be positioned or is positioned between the carrier substrates. Thereby, between a first contact section of the first carrier substrate and a first terminal of the energy storage cell, a first contact may be producible or be produced, between a second contact section of the second carrier substrate and a second terminal of the energy storage cell, a second contact being able to be produced or being produced. Such a specific embodiment has the advantage that the sensor device, based on the two carrier substrates, may be able to have inserted or may have inserted on it an increased number of electronic components.

A further specific embodiment may, for instance, include an energy harvesting circuit and/or an energy harvesting generator (such as a solar cell or a thermoelectric generator or even an induction coil for wireless charging) on one side. In case no components are located on one side, the counter-contact may be executed as a link. This link may be used for programming the component at the same time.

A method is provided for producing a sensor device, the method having the following steps:

Providing en energy storage cell and at least one carrier substrate for at least one detector, the at least one carrier substrate having at least one contact section; and producing an electrically conductive and mechanical contact between the at least one contact section of the at least one carrier substrate and the energy storage cell.

A specific embodiment of the abovementioned sensor device may advantageously be produced by carrying out the method. In the step of production, the contact may be produced using soldering means or an electrically conductive adhesive. In this context, an electrically conductive contact may be produced using at least one electric line in the carrier substrate. In particular, in the step of providing, a carrier substrate may be provided which has a base area which is smaller than, or equal to a base area of the energy storage cell. Also in the step of providing, a carrier substrate may be provided which has inserted on it the at least one detector and possibly additional electronic components of the sensor device.

According to one specific embodiment, in the step of providing, a carrier substrate may be provided, to which a connecting device is connected in an electrically conductive manner. In this case, in the step of producing, between a contact section of the carrier substrate and a first terminal of the energy storage cell, a first contact may be produced, and between the connecting device and a second terminal of the energy storage cell, a second contact may be produced. Such a specific embodiment has the advantage that a particularly compact and space saving sensor device may be produced.

Alternatively, in the step of providing, a first carrier substrate and a second carrier substrate may be provided, which are connected to each other electrically conductively using a connecting device. In this case, in the step of producing, between a first contact section of the first carrier substrate and a first terminal of the energy storage cell, a first contact may be produced, and between the second contact section of the second carrier substrate and a second terminal of the energy storage cell, a second contact may be produced. In this case, the energy storage cell is able to be positioned or is positioned between the carrier substrates. Such a specific embodiment has the advantage that, based on the two carrier substrates, a sensor device, able to have inserted or having inserted on it an increased number of electronic components, is able to be produced.

DETAILED DESCRIPTION

Figure 1:
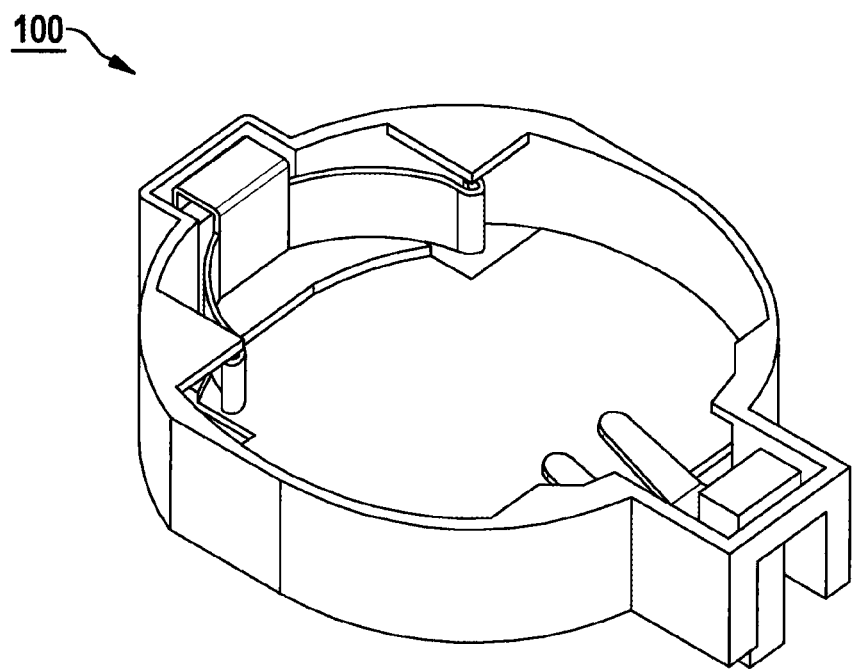
FIGS. 1-2 show perspective representations of battery holders.

In the subsequent description of favorable exemplary embodiments of the present invention, the same or similar reference numerals are used for the elements that are shown in the various figures and act similarly, a repeated description of these elements having been dispensed with.

FIG. 1 shows a perspective representation of a battery holder 100. Battery holder 100 is developed to hold and to contact a galvanic cell, particularly a button cell. In this context, battery holder 100 is shaped as a component that is separate from a carrier substrate, having a plastic housing and metallic contacts. Battery holder 100 is provided for a CR2032 battery, for example.

Figure 2:
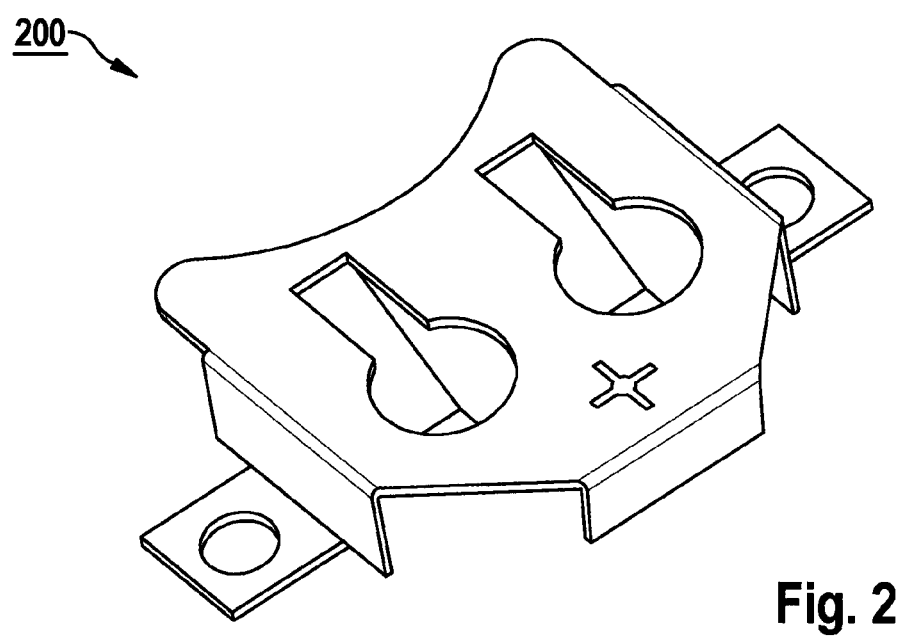

FIG. 2 shows a perspective representation of a battery holder 200. Battery holder 200 is developed to hold and to contact a galvanic cell, particularly a button cell. In this context, battery holder 200 is shaped as a metallic component that is separate from a carrier substrate. Battery holder 200 is provided for a CR2032 battery, for example.

Figure 3:
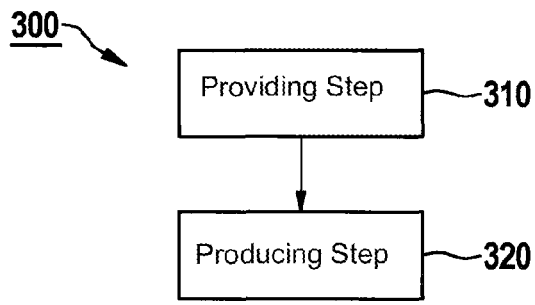
FIG. 3 shows a flow chart of a method for manufacturing a sensor device according to an exemplary embodiment of the present invention.
Figure 4:
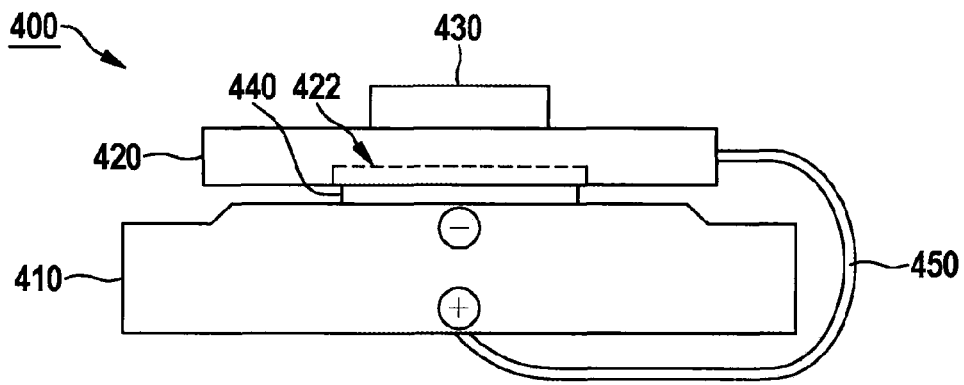
FIGS. 4-5 show schematic sectional representations of sensor devices according to specific embodiments of the present invention.
Figure 5:
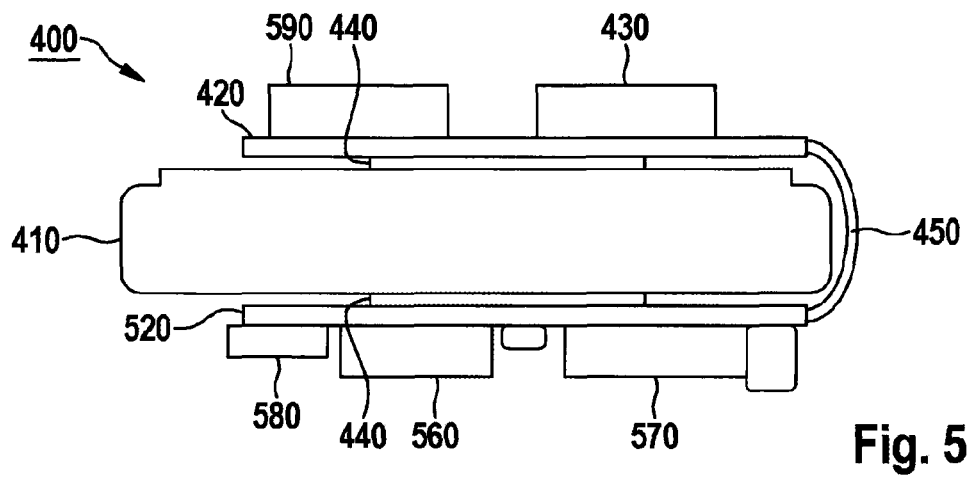

FIG. 3 shows a flow chart of a method 300 for manufacturing a sensor device, according to an exemplary embodiment of the present invention. A sensor device such as the sensor device of FIG. 4 or FIG. 5 is advantageously producible by carrying out method 300. The sensor device may be used, for example, in the field of networked systems, such as for the Internet of Things (IoT), for space climate monitoring, or the like, for example.

Method 300 has a step 310 of providing a galvanic cell (as the exemplary embodiment of an energy storage cell) and at least one carrier substrate for at least one detector. In this context, the at least one carrier substrate has at least one contact section. In particular, in step 310 of providing, a carrier substrate is provided, which has inserted on it the at least one detector and possibly additional electronic components of the sensor device. According to one exemplary embodiment, in step 310 of providing, a carrier substrate may be provided which has a base area which is smaller than, or equal to a base area of the galvanic cell.

Method 300 also has a step 320 of producing an electrically conductive and mechanical contact between the at least one contact section of the at least one carrier substrate and the galvanic cell. In particular, in this context, in step 320 of the production, an electrically conductive contact is produced with at least one electric line in the carrier substrate. According to one exemplary embodiment, in step 320 of the production, the contact is produced using soldering means or an electrically conductive adhesive.

In order to produce a sensor device like the sensor device in FIG. 4, according to one specific embodiment, in step 310 of the providing, a carrier substrate is provided, to which a connecting device, for instance, a flexible band having a plurality of electric lines, is connected electrically conductively. Furthermore, in step 320 of the production, a first contact is produced between a contact section of the carrier substrate and a first terminal of the galvanic cell. Furthermore, in step 320 of the production, a second contact is produced between the connecting device and a second terminal of the galvanic cell.

In order to produce a sensor device like the one in FIG. 5, according to one specific embodiment, in step 310 of providing, a first carrier substrate and a second carrier substrate are provided which are connected to each other using a connecting device, in an electrically conductive manner. In this context, in step 320 of the production, a first contact is produced between a first contact section of the carrier substrate and a first terminal of the galvanic cell. Furthermore, in step 320 of the production, a second contact is produced between a second contact section of the second carrier substrate and a second terminal of the galvanic cell. Thus, the galvanic cell is situated between the carrier substrates.

FIG. 4 shows a schematic sectional illustration of a sensor device 400 according to an exemplary embodiment of the present invention. What is shown in sensor device 400, in the illustration of FIG. 4 in this case, is a galvanic cell 410 (as an exemplary embodiment of an energy storage cell), a carrier substrate 420, a contact section 422, a sensor, or rather, a detector 430, a contact material 440 and a connecting device 450. Instead of galvanic cell 410, without restriction of the scenario of use, any other energy storage cell may be used, such as a fuel cell. Furthermore, in FIG. 4, using a minus symbol, there is illustrated a first terminal of galvanic cell 410, and using a plus symbol, a second terminal of galvanic cell 410 is illustrated. Sensor device 400 may be used, for example, in the field of networked systems, such as for the Internet of Things (IoT), for space climate monitoring, or the like, for example.

Link 450 may be used as a programming contact at the same time, in order to write a program code, for example, into a component of sensor device 400 or to read it out of there.

According to the exemplary embodiment of the present invention shown in FIG. 4, sensor device 400 has, among other things, galvanic cell 410 and carrier substrate 420. Carrier substrate 420 has contact section 422 for producing an electrically conductive and mechanical contact with galvanic cell 410.

According to the exemplary embodiment of the present invention shown in FIG. 4, galvanic cell 410 is shaped as a button cell, particularly as a secondary cell in the form of a button cell. Simple button cells, such as CR2032, having a diameter of 20 millimeter and a height of 3.2 millimeter, for example, have a very good capacity to volume ratio. The volume of the button cell amounts to ca. 1 cubic centimeter and an electrical capacity of 220 milliamperehours. A rechargeable variant is available in the market by the name LIR2032, for example.

In FIG. 4, galvanic cell 410 is shown in an electrically conductive and mechanically contacted state with carrier substrate 420. In this context, the first terminal of galvanic cell 410 is situated on the side facing carrier substrate 420 of galvanic cell 410, the second terminal of galvanic cell 410 being situated on the side of galvanic cell 410 facing away from carrier substrate 420.

Galvanic cell 410 is applied to contact section 422 of carrier substrate 420 using contact material 440. Contact material 440 has soldering means or an electrically conductive adhesive, for example. Thus, using an electrically conductive connection in a continuous material, a contact is produced between galvanic cell 410 and contact section 422 of carrier substrate 420. To put it more precisely, an electrically conductive and mechanical contact of galvanic cell 410 and contact section 422 of carrier substrate 420 is produced.

Carrier substrate 420 may be shaped as a printed circuit board, a semiconductor substrate, or the like. Carrier substrate 420 has a composite material such as FR4, for example. Even though it may not be explicitly recognizable in FIG. 4, carrier substrate 420 may have an essentially circular cross section. In this instance, carrier substrate 420 has a base area that is smaller than the base area of galvanic cell 410. Contact section 422 of carrier substrate 420 is developed to produce the electrically conductive and mechanical contact between galvanic cell 410 and carrier substrate 420 or at least one electric line in carrier substrate 420. For this purpose, contact section 422 is situated on the first main surface of carrier substrate 420 facing galvanic cell 410.

Detector 430 is situated on a second main surface of carrier substrate 420 that faces away from galvanic cell 410 or lies opposite to the first main surface. Detector 430 is connected electrically conductively on the second main surface of carrier substrate 420 to carrier substrate 420 or to at least one electric line in carrier substrate 420. Although it is not shown in FIG. 4, on the second main surface of carrier substrate 420 there may further be a control device, such as a microcontroller, a data transmission device, for instance, a radio chip, an antenna and additionally or alternatively at least one further electronic component of sensor device 400.

Connecting device 450 is executed as a flexible band having at least one electric line. Connecting device 450, at its first end, is connected electrically conductive to carrier substrate 420. Furthermore, connecting device 450, at its other end, is connected electrically conductive to the second terminal of galvanic cell 410. Consequently, between the second end of connecting device 450 and the second terminal of galvanic cell 410 a second electrically conductive and mechanical contact is produced. Galvanic cell 410 is connected to carrier substrate 420 mechanically as well as electrically conductive using contact material 440 and using connecting device 450.

In other words, with carrier substrate 420 only one rigid part having components such as detector 430 is present, and moreover, with connecting device 450, an electrically conductive, flexible band is present in order to contact the second terminal of galvanic cell 410 or a second battery side. Such a design is able to reduce further the system costs, and may advantageously be applied in the case of simple systems.

FIG. 5 shows a schematic sectional illustration of a sensor device 400 according to an exemplary embodiment of the present invention. What is shown of sensor device 400 in the illustration of FIG. 5, in this case, is a galvanic cell 410, a carrier substrate 420, a contact section 422, a sensor or detector 430, a contact material 440, a connecting device 450, an additional carrier substrate 520, a control device 560 or a microcontroller, a data transmission device 570 or a radio chip, an antenna or an antenna terminal 580 or a plug connector for an antenna and an additional electronic component 590. A further specific embodiment may, for instance, include an energy harvesting circuit and/or an energy harvesting generator (such as a solar cell or a thermoelectric generator or even an induction coil for wireless charging) on one side. In case no components are located on one side, the counter-contact may be executed as a link. This link may be used for programming the component at the same time.

In this case, sensor device 400 shown in FIG. 5 essentially corresponds to sensor device 400 shown in FIG. 4, with the exception that the two carrier substrates 420 and 520 are provided so that they are connected to each other electrically conductive by connecting device 450, and that on carrier substrates 420 and 520, in addition to detector 430, control device 560, data transmission device 570, the antenna, or rather antenna terminal 580 and the additional electronic component 590 are situated. Only the terminals of galvanic cell 410 and contact sections of carrier substrate 420 and 520 have been omitted from FIG. 5 for reasons of clarity.

According to the exemplary embodiment of the present invention shown in FIG. 5, galvanic cell 410 is situated between carrier substrate 420 and additional carrier substrate 520.

Galvanic cell 410 corresponds to the galvanic cell of FIG. 4. Carrier substrate 420 and additional carrier substrate 520 correspond to the carrier substrate of FIG. 4. Consequently, carrier substrate 420 has a contact section, and additional carrier substrate 520 has an additional contact section.

Between the contact section of carrier substrate 420 and the first terminal of galvanic cell 410, using contact material 440, a first electrically conductive as well as mechanical contact is produced. Furthermore, between the additional contact section of further carrier substrate 520 and the second terminal of galvanic cell 410, using contact material 440, an additional electrically conductive as well as mechanical contact is produced.

On the second main surface of carrier substrate 420 facing away from galvanic cell 410, detector 530 and additional electronic components 590 are situated. On the second main surface of additional carrier substrate 520, facing away from galvanic cell 410, control device 560, data transmission device 570 and the antenna or rather antenna terminal 580 are situated.

In other words, carrier substrates 420 and 520 include two printed circuit boards (PBC's) that are round and rigid, for example, which are connected to each other electrically using connecting device 450 or a flexband. Components 430, 560, 570, 580 and 590 are situated on the second main surfaces or the upper sides, or rather outer sides of carrier substrates 420 and 520, facing away from galvanic cell 410. Because of connecting device 450, carrier substrates 420 and 520 may be bent in such a way that galvanic cell 410 is located between them. Galvanic cell 410 may be contacted, for instance, by a conductive adhesive or by solder. By such a firm linking, a mechanical fastening is also implemented. Dimensions of carrier substrates 420 and 520 or rather, of the rigid parts, may be of equal size or smaller than those of galvanic cell 410, depending on battery size and carrier size. The dimensions of carrier substrates 420 and 520 may be decisively determined by a number and size of components 430, 560, 570, 580 and 590. Consequently, galvanic cell 410, for instance, as a battery of the type LIR2032, is adhered or soldered between the two carrier substrates 420 and 520, which are electrically connected to each other using connecting device 450. Thus, sensor device 400 is able to represent a battery-appropriate sensor design having radio connection, for instance, for the Internet of Things.

Moreover, it is also conceivable that sensor device 400, or a part of same, could be used as an element for energy harvesting (i.e. for recovering energy). In this connection, control device 560 or the microcontroller, and/or data transmission device 570 (for instance, for every other element of sensor device 400) may be embodied as a solar cell, as a thermoelectric generator or as an inductive charging element, or may include such an element. In this way, a certain portion of electrical energy may be reached by the conversion of physical variables acting upon sensor device 400.

The exemplary embodiments described and shown in the figures have been selected merely as examples. Different exemplary embodiments are combinable with one another, either completely or with regard to individual features. An exemplary embodiment may also be supplemented by features from another exemplary embodiment.

Furthermore, method steps provided in this document may be carried out repeatedly and also performed in a sequence other than the one described.

If an exemplary embodiment includes an "and/or" linkage between a first feature and a second feature, this is to be understood to mean that the exemplary embodiment according to one specific embodiment has both the first feature and the second feature, and according to another specific embodiment, either has only the first feature or only the second feature.

What is claimed is:

1. A sensor device, comprising:
   an energy storage cell;
   at least one carrier substrate for at least one detector, wherein the at least one carrier substrate has at least one contact section for producing an electrically conductive and mechanical contact to the energy storage cell; and
   a connecting device that is one of connectable and connected to the carrier substrate in an electrically conductive manner, wherein a first contact is one of producible and produced between the contact section of the carrier substrate and a first terminal of the energy storage cell, and wherein a second contact is one of producible and produced between the connecting device and a second terminal of the energy storage cell.

2. The sensor device as recited in claim 1, wherein the at least one carrier substrate has a base area which is no greater than a base area of the energy storage cell.

3. The sensor device as recited in claim 1, wherein the energy storage cell is one of mountable and mounted on the at least one contact section of the at least one carrier substrate using one of a soldering means or an electrically conductive adhesive.

4. The sensor device as recited in claim 1, wherein the energy storage cell is shaped as at least one of a galvanic cell and a button cell.

5. The sensor device as recited in claim 1, wherein the at least one contact section is situated on a first main surface of the at least one carrier substrate, the at least one detector being one of positionable and positioned at a second main surface of the at least one carrier substrate lying opposite to the first main surface.

6. A sensor device comprising:
   an energy storage cell; and
   at least one carrier substrate for at least one detector, wherein the at least one carrier substrate has at least one contact section for producing an electrically conductive and mechanical contact to the energy storage cell;
   wherein:
     the at least one carrier substrate includes a first carrier substrate and a second carrier substrate,
     a connecting device via which the first and second carrier substrates are one of connectable and connected to each other in an electrically conductive manner,
     the energy storage cell is one of positionable and positioned between the first and second carrier substrates,
     a first contact is one of producible and produced between a first contact section of the first carrier substrate and a first terminal of the energy storage cell, and a second contact is one of producible and produced between a second contact section of the second carrier substrate and a second terminal of the energy storage cell.

7. A method for producing a sensor device, comprising:
providing an energy storage cell and at least one carrier substrate for at least one detector, the at least one carrier substrate having at least one contact section; and
producing an electrically conductive and mechanical contact between the at least one contact section of the at least one carrier substrate and the energy storage cell
wherein:
    in the step of providing, a connecting device is connected to the carrier substrate in an electrically conductive manner,
    in the step of producing, a first contact is produced between the contact section of the carrier substrate and a first terminal of the energy storage cell, and
    in the step of producing, a second contact is produced between the connecting device and a second terminal of the energy storage cell.

8. A method for producing a sensor device, comprising:
providing an energy storage cell and at least one carrier substrate for at least one detector, the at least one carrier substrate having at least one contact section; and
producing an electrically conductive and mechanical contact between the at least one contact section of the at least one carrier substrate and the energy storage cell;
wherein:
    in the step of providing, a first carrier substrate and a second carrier substrate are provided, which are connected to each other in an electrically conductive manner using a connecting device,
    in the step of producing, between a first contact section of the first carrier substrate and a first terminal of the energy storage cell, a first contact is produced, and between a second contact section of the second carrier substrate and a second terminal of the energy storage cell, a second contact is produced.

9. The sensor device as recited in claim 4, wherein the energy storage cell is shaped as a secondary cell in the shape of the button cell.

10. The sensor device as recited in claim 6, wherein the at least one carrier substrate has a base area which is no greater than a base area of the energy storage cell.

11. The sensor device as recited in claim 6, wherein the energy storage cell is one of mountable and mounted on the at least one contact section of the at least one carrier substrate using one of a soldering means or an electrically conductive adhesive.

12. The sensor device as recited in claim 6, wherein the energy storage cell is shaped as at least one of a galvanic cell and a button cell.

13. The sensor device as recited in claim 6, wherein the at least one contact section is situated on a first main surface of the at least one carrier substrate, the at least one detector being one of positionable and positioned at a second main surface of the at least one carrier substrate lying opposite to the first main surface.

14. The sensor device as recited in claim 12, wherein the energy storage cell is shaped as a secondary cell in the shape of the button cell.

* * * * *